(12) United States Patent
Alli et al.

(10) Patent No.: US 6,414,049 B1
(45) Date of Patent: *Jul. 2, 2002

(54) STABLE INITIATOR SYSTEM

(75) Inventors: Azaam Alli; Joe M. Wood, both of Jacksonville, FL (US); Ivan M. Nunez, Roanoke, VA (US); Robert N. Love, Jacksonville, FL (US); James D. Ford, Orange Park, FL (US); Douglas G. Vanderlaan, Jacksonville, FL (US)

(73) Assignee: Johnson & Johnson Vision Care, Inc., Jacksonville, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/532,234

(22) Filed: Mar. 22, 2000

(51) Int. Cl.$^7$ ................................................. C08F 2/48
(52) U.S. Cl. ........................... 522/84; 522/64; 522/172; 522/99; 524/858; 524/837; 524/866; 524/916
(58) Field of Search ............................ 522/38, 64, 84, 522/99, 172, 148; 524/858–864, 866, 916, 837

(56) References Cited

U.S. PATENT DOCUMENTS

| | | | |
|---|---|---|---|
| 4,136,250 A | * | 1/1979 | Mueller et al. ................ 528/29 |
| 4,153,641 A | * | 5/1979 | Deichert et al. ............. 526/264 |
| 4,414,372 A | | 11/1983 | Farnham et al. |
| 4,711,942 A | | 12/1987 | Webster |
| 4,740,533 A | * | 4/1988 | Su et al. ...................... 523/106 |
| 4,771,116 A | | 9/1988 | Citron |
| 5,019,634 A | | 5/1991 | Boettcher et al. |
| 5,021,524 A | | 6/1991 | Dicker et al. |
| 5,034,461 A | * | 7/1991 | Lai et al. ...................... 525/100 |
| 5,070,215 A | * | 12/1991 | Bambury et al. ............ 556/418 |
| 5,260,000 A | * | 11/1993 | Nandu et al. ................. 264/2.1 |
| 5,310,779 A | * | 5/1994 | Lai et al. ...................... 524/588 |
| 5,358,995 A | * | 10/1994 | Lai et al. ...................... 524/542 |
| 5,534,559 A | * | 7/1996 | Leppard et al. ................ 522/64 |
| 5,965,630 A | | 10/1999 | Imafuko et al. |
| 5,965,631 A | | 10/1999 | Nicolson et al. |
| 6,031,059 A | | 2/2000 | Vanderlaan et al. |

FOREIGN PATENT DOCUMENTS

| | | |
|---|---|---|
| EP | 262 629 B1 | 4/1988 |
| EP | 0 849 296 A2 | 6/1998 |
| WO | PCT/US01/09076 | 10/2001 |

OTHER PUBLICATIONS

Encyclopedia of Polymer Science and Engineering, John Wiley & Sons, vol. 7, p. 580, 1987.

Journal American Chemical Society, Urzula Kolczek, Gunther Rist, Jurt Dietliker and Jakob Wirz, "Reaction Mechanism of Monoacyl–and Bisacylphosphine Oxide Photo initiators Studied by P–, C–, and H—DICNP and ESR", 1996, 118, 6477–6489.

* cited by examiner

*Primary Examiner*—James J. Seidleck
*Assistant Examiner*—Sanza L. McClendon
(74) *Attorney, Agent, or Firm*—Todd Volyn

(57) ABSTRACT

Acylphosphine initiators used in making ophthalmic lenses are stabilized by the addition of an acid to the monomer mix used to make the lenses.

14 Claims, No Drawings

STABLE INITIATOR SYSTEM

BACKGROUND OF THE INVENTION

This invention relates to the use of photoiniators. More particularly, it relates to the stabilization of photoinitiators useful in processes for making ophthalmic lenses.

Ophthalmic lenses such as contact lenses are often made in processes that employ photoinitiated polymerization reactions. UV and visible radiation are most frequently used to initiate cure in these reactions. It is often desirable to prepare a mixture of materials together with an initiator or initiator system (where initiation involves more than one component) and other additives that will ultimately form the lens upon completion of the reactions. These types of mixtures are referred to as the "monomer mix" in this context. Stability of the initiator can be a crucial factor in the working time and shelf life of the monomer mix. Increasing the working time of the monomer mix is desirable since it reduces the need for preparation of starting materials and the possibility of introducing lot to lot and intra-lot variations in lens production. Acylphosphines are an interesting and useful class of initiators for free radical polymerations of the type frequently used to made ophthalmic lenses. Reaction mechanisms for many of these materials are described in Reaction Mechanism of Monoacyl- and Bisacyiphoine Oxide Photoinitiators Studied by $^{31}$P, $^{13}$C-, and $^{1}$H-CIDNP and ESR, Ursul Kolczak, Gunther Rise, Kurt Dietliker, and Jacob Wirz, 118 J. Am. Chem. Soc., 6477 (1996). Bisacylphosphines and their use are further described in U.S. Pat. No. 5,534,559 and JP-A-8-259642 incorporated herein by reference.

Unfortunately, this class of compounds tends to be unstable in a variety of environments lessening its potential as an active initiator. EP 849,296 proposes a method of stabilizing bisacylphosphine initiators used in the production of urethane (meth)acrylate polymers used for coatings. The method involves combining the monomer components together with the initiator in the presence of a tertiary amine and in the absence of a tin component. Japanese patents JP-A-4-6125; JP-A-296315; JP-A8-127630 propose similar methods of stabilizing monoacylphospine photoinitiators in the presence of a tin compound used as a polymerization catalyst.

Unfortunately, these solutions are not desirable when applied to monomer mixes used to make ophthalmic lenses because of the potentially deleterious effect they may have on various components of the monomer mix. This is particularly true where the monomer mix is used to make silicone hydrogel lenses.

A new method for stabilizing acylphosphine initiators is desirable.

SUMMARY OF THE INVENTION

The invention is a stable monomer mix for making ophthalmic lenses. The stable monomer mix is made by admixing a monomer mixture, an initiator, and an acid.

In another aspect of the invention a silicone hydrogel monomer formulation is made by admixing a silicone hydrogel forming mixture, an initiator, and an acid.

In yet another aspect of the invention, a method of stabilizing an initiator system comprises lowering the pH of the initiator system.

In yet another aspect of the invention, a process for stabilizing a silicone hydrogel monomer formulation in an admixture of a reactive silicone macromer and a photoinitiator comprises admixing an acid with the admixture of macromer and photoinitiator.

DETAILED DESCRIPTION OF THE INVENTION

The initiators of this invention are those having the following structure:

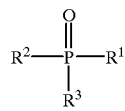

Structure I wherein, $R^1$, $R^2$, and $R^3$ are each independently H or a $C_{1-12}$ substituted or unsubstituted alkyl cycloalkyl, or aromatic moiety provided that at least one of $R^1$, $R^2$ and $R^3$ has the following structure:

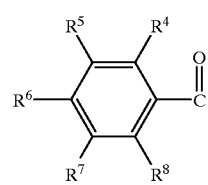

Structure II and is attached to the P at the acyl carbon, and wherein, $R^4$–$R^8$ are independently, H or a $C_{1-3}$ substituted or unsubstituted alkyl or alkoxy moiety.

In each case, where an $R^1$–$R^8$ group is substituted, the substituent can comprise a hydroxy or $C_{1-4}$ alkyl alkoxy, alkenyl, or alkynyl group. Substitution with hetero atoms such as nitrogen, sulfur, and halo atoms is possible but is not favored.

It is preferred that $R^1$ and $R^2$ are both Structure II moieties with $R^4$ and $R^8$ substituents. It is most preferred that $R^4$ and $R^8$ are methoxy groups. It is further preferred in this embodiment that $R^3$ is a $C_{1-10}$ alkyl alkoxy, or alkenyl group substituted with $C_{1-2}$ alkyl groups; most preferably a substituted pentyl group.

In the most preferred embodiment, $R^1$ and $R^2$ are both Structure II moieties with $R^4$ and $R^8$ being methoxy groups; $R^1$ is a trimethyl pentyl group. Thus, the most preferred embodiment has the following structure:

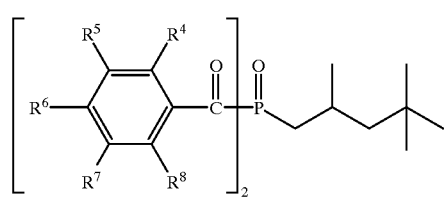

Structure III

Theses initiators can be used alone or in combination with other initiators such as benzoin methyl ether, 1-hydroxycyclohexyl phenyl ketone, Irgacure 1850 brand photoinitiator, 1-hydroxy cyclohexyl phenyl ketone (commercially available as "Irgacure 184"); 2-benzyl-2-n-dimethylamino-1-(4-morpholinophenyl)-i-butanone (commercially available as "Irgacure 369"); 1-hydroxycyclohexyl phenyl ketone (50% by weight) plus benzophenone(commercially available as "Irgacure 500"); 4-(2-hydroxyethoxy) phenyl-(2-hydroxy propyl)ketone (commercially available as "Irgacure 2959"); 2,4,6-Trimethyl benzoyl diphenyl phosphineoxide (TPO) (50% by weight) plus 2-hydroxy-2-methyl-1-phenyl-propan-1-one (HMPP) (50% by weight) (commercially available as "Darocur 4265"); 2,2-dimethoxy-2-phenylacetophenone (BDK) (commercially available as "Irgacure 651"); bis (n1-2,4-cyclopentadien-1-yl), bis (2,6-difluoro-3-(IH-pyrrol-1-yl)phenyl) Titanium (CGI-784); 2-methyl-1-(4-(methylthio)phenyl)-2-morpholino propan-1-one (MAP) (commercially available as "Irgacure 907"); 2-hydroxy-2-methyl-1-phenyl-propan-1-one (HMPP) (commercially available as "Darocur 1173"); or mixtures thereof. Mixtures that include a UV and visible light initiator system are preferred as they permit more flexible use of UV blockers in the monomer mix.

The stabilizers useful in this invention are acids. These are preferably weak organic acids but may include strong inorganic acids as well as Lewis acids. Additionally, precursors capable of generating acids in the reaction mixture can also be used. The most preferred acids are acetic acid, formic acid, propionic acid, and acrylic acid.

The inorganic acids include, for example, hydrochloric acid, hydrobromic acid, sulfuric acid, phosphoric acid, hydroiodic acid, hydrofluoric acid, sulfurous acid, nitric acid, nitrous acid, phosphorous acid, perchloric acid, chloric acid, chlorous acid, iodic acid, bromic acid, arsenic acid, carbonic acid, selenium hydride, tellurium hydride, phosphonic acid, hypophosphoric acid, diphosphonic acid, pyrophosphoric acid, metaphosphoric acid, polyphosphoric acid, selenic acid, selenious acid, telluric acid, tellurous acid, arsenious acid, antimonic acid, antimonous acid, borofluoric acid, etc.

The organic acids include, for example, the sulfonic acids such as hydroxymethanesulfonic acid, trifluoromethanesulfonic acid, beta-bromoethanesulfonic acid, allylsulfonic acid, 2-methyl-2-[(1-oxo-2-propenyl)amino]-1-propanesulfonic acid, D-10-camphorsulfonic acid, benzenesulfonic acid, m-nitrobenzenesulfonic acid, m-benzenedisulfonic acid, methanesulfonic acid, ethanesulfonic acid, 2-hydroxyethanesulfonic acid, 2-(cyclohexenylamino)methanesulfonic acid, (3-cyclohexenylamino)methanesulfonic acid, p-ethylbenzenesulfonic acid, alpha-naphthalenesulfonic acid, beta-naphthalenesulfonic acid, p-toluenesulfonic acid, p-chloromethylbenzenesulfonic acid, p-phenolsulfonic acid, 2-pyridylhydroxymethanesulfonic acid, 2,6-naphthalenedisulfonic acid, etc.; the organic sulfinic acids such as benzenesulfinic acid, p-toluenesuifinic acid, etc.; the organic phosphoric acids such as phenylphosphonous acid, butyphosphonous acid, methylphosphonous acid, dibenzenephosphinic acid, dibutylphosphinic acid, benzenephosphonic acid, methylphosphonic acid, phenylphosphinic acid, methylphosphinic acid, dibenzenethiophosphinic acid, dibutylthiophosphinic acid, benzenethiophosphonic acid, methylthiophosphonic acid, phenylthiophosphinic acid, methylthiophosphinic acid, benzenethiophosphonous acid, dibutylthiophosphonous acid, diethyl dithiophosphate, alpha-hydroxybenzylphosphonous acid, toluenephosphonous acid, etc.; the substituted or non-substituted aliphatic carboxylic acids include for example mandelic acid, acetic acid, lactic acid, ascorbic acid, phenylacetic acid, bromoacetic acid, trichloroacetic acid, chlorodifluoroacetic acid, thioacetic acid, glycolacetic acid, glyoxylic acid, acrylic acid, beta chloroacrylic acid, cyanoacetic acid, ethoxyacetic acid, beta-chloropropionic acid, perfluoropropionic acid, propiolic acid, n-butyric acid, isobutyric acid, alpha-hydroxyisobutyric acid, crotonic acid, mucochloric acid, cyclopropanecarboxylic acid, isovaleric acid, 1-methylcyclopropanecarboxylic acid, 1-cyanocyclopropanecarboxylic acid, cyclobutanecarboxylic acid, cyclopentanecarboxylic acid, 2-ketobutyric acid, levulinic acid, pivalic acid, tert-butylacetic acid, coumarinic acid, 3-cyclohexenecarboxylic acid, beta-2-furylacrylic acid, 3-pyridylacetic acid, phenylthioacetic acid, m-chlorophenylacetic acid, o-nitrophenylacetic acid, p-fluorophenylacetic acid, o-hydroxyphenylacetic acid, phenoxyacetic acid, o-chlorophenoxyacetic acid, 2,4-dichlorophenoxyacetic acid, 2,4,5-richlorophenoxyacetic acid, cyclohexylacetic acid, 1-methyl-1-cyclohexanecarboxylic acid, 6-acetamidohexanoic acid, heptylic acid, dl-terebic acid, benzoylformic acid, cinnamic acid, o-chlorocinnamic acid, 2,4-dichlorociniumic acid, m-nitrocinnamic acid, o-hydroxycinnamic acid, d-2-phenoxypropionic acid, 3-phenoxypropionic acid, 3-phenylpropionic acid, 3-(p-hydroxyphenyl)propionic acid, 2-(2,4,5-trichlorophenoxy)propionic acid, 4-methoxyphenylacetic acid, p-chloro-2-methylphenylacetic acid, 3,4-methylenedioxyphenylacetic acid, 4-chloro-2-methylphenoxyacetic acid, m-tolylacetic acid, alpha, alpha, alpha-trifluoro-m-tolylacetic acid, p-hydroxyphenylpyruvic acid, alpha-cyanocinnamic acid, p-methoxycinnamic acid, m-trifluoromethylcinnamic acid, 3,4-methylenedioxycinnamic acid 3,4 dimethoxyphenylacetic acid, (−)-alpha-methoxy-alpha-trifluoromethylphenylacetic acid, 1,4-benzdioxane-6-acetic acid, 3-phenyl-n-butyric acid, 1-phenyl-1-cyclopropanecarboxylic acid, 2-(p-methoxyphenyl)-acetylene-1-carboxylic acid, 3-benzoylpropionic acid, 2-(p-chlorophenoxy)-2-methylpropionic acid, alpha-naphthylacctic acid, beta-naphthoxyacetic acid, 3,4,5-trimethoxyphenylacetic acid, diphenylacetic acid, bis(p-chlorophenyl)acetic acid, 1-menthoxyacetic acid, diphenyleneacetic acid, 1-phenylcyclopentanecarboxylic acid, 1-(p-chlorophenyl)-1-cyclopentanecarboxylic acid, dl-3-camphorcarboxylic acid, palmitic acid, stearic acid, benzilic acid, desoxycholic acid, linolic acid, oleic acid, alpha-acetamidocinnamic acid, etc.; the aromatic carboxylic acids include for example benzoic acid, salicylic acid, o-toluic acid, alpha, alpha, alpha-trifluoro-m-toluic acid, p-ethylbenzoic acid, 2,6-dimethylbenzoic acid, 2,4,6-trimethylbenzoic acid, p-tertbutylbenzoic acid, p-bromomethylbenzoic acid, 2-biphenylcarboxylic acid, 4,4'-methylenebis(3-hydroxy-beta-naphthoic acid), alpha-naphthoic acid, p-benzoylbenzoic acid, phthalamic acid, o-phthalaldehydic acid, m-nitrobenzoic acid, 3,4-dinitrobenzoic acid, m-cyanobenzoic acid, thiosalicylic acid, gallic acid, m-hydroxybenzoic acid, 2,3-dihydroxybenzoic acid, 1-hydroxy-2-naphthoic acid, o-anisic acid, 3,4-dimethoxybenzoic acid, 4-hydroxy-3-methoxybenzoic acid, 4-hydroxy-3,5-dimethoxybenzoic acid, 4-n-butoxybenzoic acid, 3-phenoxybenzoic acid, piperonylic acid, o-acetamidobenzoic acid, p-chlorobenzoic acid, 3,5-dichlorobenzoic acid, o-fluorobenzoic acid, m-fluorobenzoic acid, 2,6-difluorobenzoic acid, 2,6-dichlorobenzoic acid, 2,3,5-triiodobenzoic acid, 4-chlorosalicylic acid, 3-nitrosalicylic acid, 5-bromosalicylic acid, 2-chloro-3-nitrobenzoic acid, 3-chloro-4-hydroxybenzoic acid, 3,5-dichloro-4-hydroxybenzoic acid, 3-chloro-4-methylbenzoic acid, 3-methoxy-4-nitrobenzoic acid, 3-methoxy-4-hydroxybenzoic acid, 3-methoxy-4-methylbenzoic acid, 3-methyl-2-nitrobenzoic acid, 3-hydroxy-4-nitrobenzoic acid, 3,5-di-tert-butyl-4-hydroxybenzoic acid, o-thymotinic acid, etc.; the heteroaromatic carboxylic acids include for example N-methylpyrrole-2-carboxylic acid, 2-furancarboxylic acid, 5-bromo-2-furancarboxylic acid, pyrrole-2-carboxylic acid, 3-furancarboxylic acid, nicotinic acid, isonicotinic acid, citrainic acid, alpha-picolinic acid, etc.; the substituted or non-substituted aliphatic polyhydric carboxylic acids include for example succinic acid, fumaric acid, maleic acid, malic acid, tartaric acid, citric acid, oxalic acid, malonic acid, ethylmalonic acid, hydroxymalonic acid, methylsuccinic acid, 2-methyl-2-phenylsuccmnic acid, 2-ethyl-2-methylsuccinic acid, 2-isopropylsuccinic acid, bromosuccinic acid, 2,3-dibromosuccinic acid, alpha-ketoglutaric acid, 3-ethyl-3-methylglutaric acid, glutaconic acid, itaconic acid, mesaconic acid, citraconic acid, adipic acid, camphoric acid, diglycollic acid, acetylenedicarboxylic acid, dimethylcyclopropanedicarboxylic acid, etc.; the aromatic dicarboxylic acids include for example phthalic acid, isophthalic acid, terephthalic acid, homophthalic acid, 3-nitrophthalic acid, 4-hydroxyisophthalic acid, tetrachlorophthalic acid tetrachloroterephthalic acid, nitroterephthalic acid, pyrazine-2,3-dicarboxylic acid, o-phenylenediacetic acid, 5,5'-methylenedisalicylic acid, etc.; the phenols include for example picric acid, 2,4-dinitrophenol, 2,6-dinitrophenol, 2,6-diiodo-4-nitrophenol, 2,6-dichloro-4-nitrophenol, 2,5-dichloro-4-nitrophenol, 2,6-dibromo-4-nitrophenol, 2-bromo-4-chloro-6-nitrophenol, 2-dichloro-6-nitrophenol, etc.; and the substituted or non-substituted dithiocarbamic acids include for example 2-cyclohexenyldithiocarbamic acid, 2-cycloheptenyldithiocarbamic acid, methyldithiocarbamic acid, dimethyldithiocarbamic acid, ethylenebis (dithiocarbamic acid), etc.

Lewis acids include, for example, boron trifluoride, boron trichloride, boron tribromide, aluminum fluoride, aluminum chloride, aluminum bromide, aluminum iodide, aluminum sulfate, iron fluoride, iron chloride, iron bromide, iron nitrate, iron sulfate, gallium fluoride, gallium chloride, antimony fluoride, antimony chloride, antimony sulfte, indium fluoride, indium chloride, tin fluoride, tin chloride, tin bromide, tin iodide, arsenic fluoride, arsenic chloride, zinc fluoride, zinc chloride, zinc bromide, zinc iodide, copper chloride, barium chloride, silver chloride, etc.

It is generally desirable that acids used in the practice of this invention are of such molarity or concentration that they imbue the monomer mix in which they are to be used with a pH of 3 to 8. Preferably, it is less than 7. While the upper end of the pH scale to which the monomer mix could be lowered is slightly alkaline, the addition of acid lowers the pH to point that it would not otherwise reside. In any event, in the case of a monoprotic acid such as HCL, about 0.1 to about 10 weight % of acid is used in the monomer mix. Based on this, the skilled artisan can readily determine equivalent ranges for other acids useful in the practice of this invention.

Making the lenses of this invention is conducted by combining the components of the monomer mix together with the initiators and stabilizers described above according to well known methods of lens formation such as photoinitiated casting in lens molds.

Silicone hydrogels have high oxygen permeability making them particularly desirable for use in the lenses of this invention. When the monomer mix comprises components for the preparation of silicone hydrogels, it is referred to herein as a silicone hydrogel forming mixture. Silicone hydrogels are preferably prepared by polymerizing a mixture containing at least one silicone-containing monomer and at least one hydrophilic monomer. Either the silicone-containing monomer or the hydrophilic monomer may function as a crosslinking agent or a separate crosslinker may be employed. Crosslinking agents are monomers having multiple polymerizable moieties. The term "monomer" when used in this sense refers to a material used in forming the ultimate polymer system The crosslinking agent can be monomeric, dimeric, trimeric, or polymeric molecules and still be considered a monomer with respect to the silicone hydrogel ultimately produced from it. The polymerizable functionalities generally bond to more than one polymer chain creating a network or network-like polymeric structure. There are numerous silicone-containing monomeric units commonly used in the formation of silicone hydrogels. U.S. Pat. Nos. 4,136,250; 4,153,641; 4,740,533; 5,034,461; 5,070,215; 5,260,000; 5,310,779; and 5,358,995 provide some useful examples and each is incorporated herein by reference.

Hydrophilic monomers that have previously been found useful for making silicone hydrogels include: unsaturated carboxylic acids, such as methacrylic and acrylic acids; acrylic substituted alcohols, such as 2-hydroxyethylmethacrylate and 2-hydroxyethylacrylate; vinyl lactams, such as N-vinyl pyrrolidone; and acrylamides, such as methacrylamide and N,N-dimethylacrylamide. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277 and each is incorporated herein by reference.

The preferred components of the monomer mix used to make the silicone hydrogel lenses of this invention include, for example, siloxanes and acrylic/methacrylic acid and derivatives, polyvinyl, typically di- or tri-vinyl monomers, such as di- or tri(meth)acrylates of diethyleneglycol, triethyleneglycol, butyleneglycol and hexane-1,6-diol; divinylbenzene. In the preferred embodiment, the siloxane component is a polydimethyl siloxane. It is combined with a hydrophilic monomer such as hydroxyethyl methacrylate or acrylate derivative. In the most preferred embodiment, the monomers comprise mono-alkyl terminated polydimethylsiloxanes ("mPDMS") such as monomethacryloxy propyl terminated polydimethyl siloxane and a macromer comprising the reaction product of 2-hydroxyethyl methacrylate, methyl methacrylate, methacryloxypropykris (trimethylsiloxy)silane, mono-methacryloxypropyl terminated mono-butyl terminated polydimethylsiloxane, and 3-isopropenyl-α,α-dimethylbenzyl isocyanate. Additionally preferred monomers include, for example, methacryloxypropyl tris(trimethyl siloxy) silane, "TRIS"; N,N-dimethyl acrylamide, "DMA"; triethyleneglycoldimethacrylate, "TEGDMA". Other monomers and crosslinking agents known in the art for making silicone hydrogels can also be used.

The employment of mPDMS is noteworthy as it is thought to be responsible for imbuing the resulting hydrogel with improved mechanical properties such as reduced elastic modulus and tan δ (loss modulus of the material divided by its elastic modulus or G"/G') without compromising monomer compatibility during the polymerization process. Unlike many of the siloxanes predominantly used at present, mPDMS has no polar functionality and is of relatively high molecular weight. Measures to improve its incorporation are thus welcome. The structure of mPDMS can be described as follows:

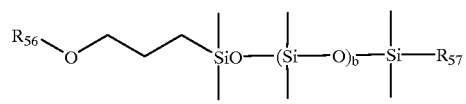

where b=0 to 100, and $R_{57}$ is any $C_{1-10}$ aliphatic or aromatic group which may include hetero atoms; provided that $R_{57}$ is not functionalized at the point at which it is bonded to Si. $C_{3-8}$ alkyl groups are preferred with butyl groups, particularly sec-butyl groups, being most preferred. $R_{56}$ is any single polymerizable vinyl group. Preferably it is a methacryl moiety but it can also be an acryl or styrenic moiety or other similar moiety.

The monomer mix also includes the initiators and acids described above. These can be added to the mix before, during, or after the mix is combined in a lens mold or other vessel for lens formation.

It is also desirable to carry out the cure in the presence of a diluent. Suitable diluents include alkanols, N,N-dimethylformamide acetamide, acetonitrile, N,N-diethylacetanide, heptane, dimethyl sulfoxide, acetone, tert-butyl acetate, ethyl acetate, isopropyl acetate, and N-methyl-2-pyrrolidone. Low molecular weight ($C_{5-12}$) akanols are preferred. Dimethyl-3octanol is most preferred.

The invention is further described in the following non-limiting examples.

EXAMPLE 1

Macromer Formation

To a solution of 13.75 ml of a 1M solution of TBACB in THF, 30.0 g bis(dimethylamno)methylsilane, 61.39 g p-xylene, 154.28 g methyl methacrylate, and 1892.13 g 2-(trimethylsiloxy)ethyl methacrylate in 4399.78 g THF at 14° C., under a $N_2$ atmosphere, was added 191.75 g of 1-trimethylsiloxy-1-methoxy-2-methylpropene. 30 ml of additional TBACB in THF (0.40 M) was added over a period of 260 minutes, during which time the reaction mixture was allowed to exotherm, and then cooled to 30° C. Sixty minutes after addition of 2-(trimethylsiloxy)ethyl methacrylate, A solution of 467.56 g 2-(trimethylsiloxy) ethyl methacrylate, 3636.6 g mPDMS and 3673.84 g TRIS and 20.0 g bis(dimethylamino)methylsilane was added, and the mixture was allowed to exotherm and then cooled to 30° C. for 2 hours. A solution of 10.0 g bis(dimethylamino) methylsilane, 154.26 g methyl methacrylate, and 1892.13 g 2-(trimethylsiloxy)ethyl methacrylate was then added and the mixture was again allowed to exotherm After 2 hours, 2 gallons of anhydrous THF was added, followed by a solution of 439.69 g water, 740.6 g methanol and 8.8 g dichloroacetic acid after the solution was allowed to cool down to 34° C. The mixture was refluxed for 4.5 hours, heating with an oil bath at 110° C., and volatiles were distilled off at 135° C., with addition of toluene to aid in removal of water, until a vapor tenmperature of 110° C. was reached.

The reaction flask was cooled to 110° C., and a solution of 443 g TMI and 5.7 g dibutyltin dilaurate was added. The mixture was reacted for 3.5 hours, then cooled to 30° C. The toluene was evaporated under reduced pressure to yield off-white, anhydrous, waxy, reactive macromer. The theoretical OH content of the macromer is 1.69 mmol/g.

EXAMPLE 2

Lens Formation

A hydrogel was made from the following monomer mix (all amounts are calculated as weight percent of the total weight of the combination): macromer of example 1 (~18%); an $Si_{7-9}$ monomethacryloxy terminated polydimethyl siloxane (~28%); methacryloxypropyl tris(trithyl siloxy) silane, "TRIS" (~14%); dimethyl amide, "DMA" (~26%); hydroxy ethyl methacrylic acid, "HEMA" (~5%); triethyleneglycoldimethacrylate, "TEGDMA" (~1%), polyvinylpyrrolidone, "PVP" (~5%); CGI 1850 (a 1:1 (wgt) blend of 1-hydroxycyclohexyl phenyl ketone and bis(2,6-dimethoxybenzoyl)-2,4-4-trimethylpentyl phosphine oxide) photoinitiator (~1%), glacial acetic acid (~5%), with the balance comprising minor amounts of additives. The polymerization was conducted in the presence of 20% wt dimethyl-3-octanol diluent.

The hydrogels were formed by adding about 0.10 g of the monomer mix to the cavity of an eight cavity lens mold of the type described in U.S. Pat. No. 4,640,489 and curing for 1200 sec. Polymerization occurred under a nitrogen purge and was photoinitiated with 5 mW $cm^{-2}$ of UV light generated with an Andover Corp. 420PS10-25 AM39565-02 light filter.

Lenses were successfully made from this monomer mix over the course of 5 days without reconsistitution of the macromer or other components of the monomer mix.

This example illustrates the lengthy working time that can be attained by stabilizing the initiator according to this invention.

EXAMPLE 3

Comparative—No Acid

Example 2 was repeated except that no acetic acid was included in the monomer mix. Lenses could only be made for 10 hours before the monomer mix required reconstitution due to loss of activity of the initiator.

EXAMPLES 4–8

Stability Studies

Solutions containing 0.8% wt of CGI 1850, and various reagents were prepared in a diluent, 3-methyl-3-pentanol. Samples were analyzed by Reversed-phase high performance liquid chromatography with Uv-Vis detection, to determine the presence of DMBAPO over time. The results are shown in Table 1.

TABLE 1

| Example | Additive | Amount added (resulting concentration) | Initial DMBAPO Conc. (%) | DMBAPO Conc (%). Time 1 | DMBAPO Conc. (%). Time 2 |
|---|---|---|---|---|---|
| 4* | DiMA | .02% wt or 0.004M | 0.4 | 0.39 (42 hr) | 0.38 (70 hr) |
| 5* | DiMa | .103% wt or 0.023M | 0.4 | 0.36 (48 hr) | 0.36 (69 hr) |
| 6 | DCAA | .244% wt or 0.019M | 0.4 | 0.40 (42 hr) | 0.40 (70 hr) |
| 7 | HCl | 0.1% or 0.01M | 0.2 | 0.2 (40 hr) | |
| 8* | TBAH | .062M | 0.2 | 0.04 (40 hr) | |

*Comparative, not according to the invention.
DiMA = dimethylamine
DCAA = dichloroacetic acid
TBAH = tetrabutylammonium hydroxide
HCl = concentrated hydrochloric acid (37% wt or 10.15M)

EXAMPLE 9–17

Stability Studies in the Presence of Macromer

Solutions containing 10% wt of the macromer described in example 1, 0.1% wt of DMBAPO and various concentrations of acids, shown in Table 2, were prepared in 2-propanol. Samples were incubated at room temperature.

TABLE 2

| Example | Additive | Additive Conc. (resulting concentration) | Initial DMBAPO Conc (%). | DMBAPO Conc. At __ hrs (%) | DMBAPO Conc. At __ hrs (%) |
|---|---|---|---|---|---|
| 10 | No additive | N/A | 0.11 | 0.094 (26.8 hr) | 0.063 (122 hr) |
| 11 | HCl | 0.01% or 0.001M | 0.13 | 0.088 (27.3 hr) | 0.067 (122 hr) |
| 12 | HCl | 0.02% or 0.002M | 0.13 | 0.126 (27.87 hr) | 0.097 (122 hr) |
| 13 | HCl | 0.05% or 0.005M | 0.13 | 0.116 (28.38 hr) | 0.109 (122 hr) |
| 14 | HCl | 0.1% or 0.01M | 0.092 | 0.093 (36.75 hr) | 0.088 (122 hr) |
| 15 | HOAc | 0.1% or 0.017M | 0.135 | 0.132 (29.43 hr) | 0.106 (122 hr) |
| 16 | HOAc | 0.2% or 0.033M | 0.107 | 0.099 (29.95 hr) | 0.09 (122 hr) |
| 17 | HOAc | 0.5% or 0.083M | 0.161 | 0.066 (30.47 hr) | 0.154 (122 hr) |
| 18 | HOAc | 1.0% or 0.167M | 0.108 | 0.112 (53.4 hr) | 0.106 (122 hr) |

HOAc = glacial acetic acid

EXAMPLE 19

Using the procedure of Examples 10–18, but storing at 45° C., the results shown in Table 3 were obtained.

TABLE 3

| Example | Additive | Additive Conc. (resulting concentration) | Initial DMBAPO Conc. (%) | DMBAPO Conc at Time 1 | DMBAPO Conc at Time 2 |
|---|---|---|---|---|---|
| 19 | No additive | N/A | 0.101 | 0.038 (50.88 hr) | 0.022 (120 hr) |
| 20 | HCl | 0.005 | 0.131 | 0.115 (50.88 hr) | 0.100 (120 hr) |
| 21 | HCl | 0.01M | 0.143 | 0.129 (50.88 hr) | 0.116 (120 hr) |
| 22 | HOAc | 0.083M | 0.113 | 0.0933 (50.88 hr) | 0.076 (120 hr) |
| 23 | HOAc | 0.167M | 0.144 | 0.126 (50.88 hr) | 0.113 (120 hr) |

EXAMPLE 24

Stability Studies of DMBAPO in Monomer Mix Containing Macromer

Three monomer mixes of the type described in Example 2 (Lens formation) were prepared. Mix 1 contained no acid addition, Mix 2 contained 0.1% wt concentrated HCl (37% wt or 10.15M) and Mix 3 contained 1.0% wt glacial acetic acid. Samples were incubated at 45° C. and analyzed by Reversed-phase high performance liquid chromatography with Uv-Vis detection, to determine the presence of DMBAPO over time. The results are shown in Table 3.

TABLE 3

| Example | Additive | Additive Conc. (resulting concentration) | Initial DMBAPO Conc. (%) | DMBAPO Conc at Time 1 | DMBAPO Conc at Time 2 |
|---|---|---|---|---|---|
| Mix 1 | No acid (Mix 1) | N/A | 0.339 | 0.144 (23 hr) | 0.044 (74.25 hr) |
| Mix 2 | HCl (Mix 2) | 0.1% | 0.374 | 0.348 (23 hr) | 0.280 (74.25 hr) |
| Mix 3 | HOAc (Mix 3) | 1.0% | 0.399 | 0.370 (23 hr) | 0.288 (74.25 hr) |

It was also found that maintaining the pH of the initiator solution between about 3 and 8 resulted in stability of the DMBAPO.

We claim:

1. A silicone hydrogel monomer formulation made by admixing:

a) a silicone hydrogel forming mixture,
b) an initiator having the structure:

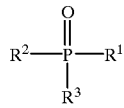

Structure I wherein, $R^1$, $R^2$, and $R^3$ are each independently H or a $C_{1-2}$ substituted or unsubstituted alkyl, cycloalkyl, or aromatic moiety provided that at least one of $R^1$, $R^2$ and $R^3$ has the following structure:

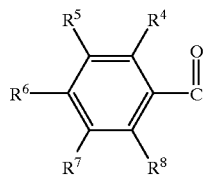

Structure II wherein, $R^4$–$R^8$ are independently, H or a $C_{1-3}$ substituted or unsubstituted alkyl or alkoxy moiety; and c) an acid wherein said acid is selected from the group consisting of Brønsted acids, Lewis acids, and mixture thereof.

2. The formulation of claim 1 wherein said acid is a weak organic acid.

3. The formulation of claim 1 wherein said acid is acetic acid.

4. The formulation of claim 1 comprising 1 to 100 equivalents of acid per mole of initiator.

5. The formulation of claim 1 wherein said acid in an inorganic acid.

6. A method of stabilizing an initiator system comprising the step of lowering the pH of said system wherein the initiator system includes a compound having the structure:

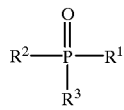

Structure I wherein, $R^1$, $R^2$, and $R^3$ are each independently H or a $C_{1-12}$ substituted or unsubstituted alkyl, cycloalkyl, or aromatic moiety provided that at least one of $R^1$, $R^2$ and $R^3$ has the following structure:

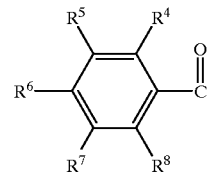

Structure II wherein, $R^4$–$R^8$ are independently, H or a $C_{1-3}$ substituted or unsubstituted alkyl or alkoxy moiety wherein the pH is lowered by the admixture of a member selected from the group consisting of Bronsted acids, Lewis acids, and mixtures thereof.

7. The process of claim 6 wherein the pH is lowered to no more than 8.

8. The process of claim 6 wherein the pH is lowered by the admixture of an acid.

9. The process of claim 6 wherein 0.1 to 10 weight % acid are admixed with said monomer mix containing initiator system.

10. A process for stabilizing a silicone hydrogel monomer formulation comprising an admixture of a reactive silicone macromer and a photoinitiator having the structure:

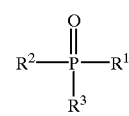

Structure I wherein, $R^1$, $R^2$, and $R^3$ are each independently H or a $C_{1-12}$ substituted or unsubstituted alkyl, cycloalkyl, or aromatic moiety provided that at least one of $R^1$, $R^2$ and $R^3$ has the following structure:

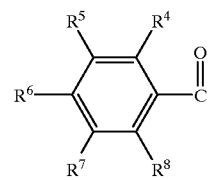

Structure II wherein, $R^4$–$R^8$ are independently, H or a $C_{1-3}$ substituted or unsubstituted alkyl or alkoxy moiety;

said process comprising the step of admixing an acid therewith, wherein said acid is selected from the group consisting of Brønsted acids, Lewis acids, and mixture thereof.

11. The process of claim 10 wherein 0.1 to 10 weight % acid are admixed with said monomer mix containing initiator system and macromer.

12. The process of claim 10 wherein said acid is a weak organic acid.

13. The process of claim 10 wherein said acid is acetic acid.

14. The process of claim 10 wherein said acid comprises a solution of at least 0.25% wt acetic acid.

* * * * *